(12) United States Patent
De Barros Braga et al.

(10) Patent No.: US 11,119,243 B2
(45) Date of Patent: Sep. 14, 2021

(54) TRACKING AND SPATIAL LOCATION SYSTEM OF MAGNETIC SENSORS AND TRACKING AND LOCATION METHOD

(71) Applicant: VALE S.A., Rio de Janeiro (BR)

(72) Inventors: Adoniran Judson De Barros Braga, Brasilia (BR); Leonardo Aguayo, Brasilia (BR); Andrè Noll Barreto, Dresden (DE); Wilson Miola, Belo Horizonte (BR); Luis Guilherme Uzeda Garcia, Massy (FR)

(73) Assignee: VALE S.A., Rio de Janeiro (BR)

( * ) Notice: Subject to any disclaimer, the term of this patent is extended or adjusted under 35 U.S.C. 154(b) by 0 days.

(21) Appl. No.: 16/850,742

(22) Filed: Apr. 16, 2020

(65) Prior Publication Data

US 2020/0371265 A1 Nov. 26, 2020

(30) Foreign Application Priority Data

Apr. 16, 2019 (BR) .......................... 102019007691-7

(51) Int. Cl.
| | |
|---|---|
| *G01V 3/08* | (2006.01) |
| *G01V 3/10* | (2006.01) |
| *G01V 3/38* | (2006.01) |
| *G01V 3/16* | (2006.01) |
| *G01V 3/12* | (2006.01) |
| *G01V 3/28* | (2006.01) |
| *G01V 11/00* | (2006.01) |

(52) U.S. Cl.
CPC .................. *G01V 3/38* (2013.01); *G01V 3/08* (2013.01); *G01V 3/083* (2013.01); *G01V 3/12* (2013.01); *G01V 3/16* (2013.01); *G01V 3/28* (2013.01); *G01V 11/007* (2013.01); *G01V 11/00* (2013.01); *G01V 2210/6163* (2013.01)

(58) Field of Classification Search
CPC . G01V 3/12; G01V 3/083; G01V 3/38; G01V 3/28; G01V 2210/6163; G01V 11/007; G01V 3/16; G01V 11/00; G01V 3/08; G01V 3/081
USPC .......... 324/67, 323, 326, 329, 330, 334, 376
See application file for complete search history.

(56) References Cited

U.S. PATENT DOCUMENTS

| | | |
|---|---|---|
| 4,710,708 A | 12/1987 | Rorden et al. |
| 2005/0057370 A1* | 3/2005 | Warrior ............. H04W 52/0216 340/870.01 |
| 2015/0091739 A1* | 4/2015 | Ridley ..................... H04Q 9/00 340/870.03 |
| 2015/0281881 A1 | 10/2015 | Appleby et al. |
| 2018/0039316 A1* | 2/2018 | Brown .............. H04L 12/40039 |

FOREIGN PATENT DOCUMENTS

WO 2012013838 A1 2/2012

* cited by examiner

*Primary Examiner* — Raul J Rios Russo
(74) *Attorney, Agent, or Firm* — Arent Fox LLP (57) ABSTRACT

The present aspects provide a tracking and spatial location system of magnetic sensors applied in extraction and transport processes in open pit mines or underground mines, allowing spatially locating one or more sensors that transmit magnetic signals through of one or more collectors that perform a reading and processing of these signals. The present aspects also to provide a tracking and location method that makes use of the magnetic sensors tracking and spatial location system, comprising the necessary steps to perform the tracking and determine the location of the sensors.

18 Claims, 8 Drawing Sheets

TRACKING AND SPATIAL LOCATION SYSTEM OF MAGNETIC SENSORS AND TRACKING AND LOCATION METHOD

CROSS-REFERENCE TO RELATED APPLICATIONS

This application claims priority to Brazilian Application No. BR 10 2019 007691 7 filed Apr. 16, 2019, the contents of which are incorporated by reference herein in their entirety.

FIELD

The present aspects relate to a tracking and spatial location system of buried and/or below soil magnetic sensors in ore extraction operations and the tracking and location method that makes use of that system.

BACKGROUND

Tracking and spatial location systems are widely known and used to monitor objects, equipment and people, using physical equipment and means of transmission and signal capture to perform this type of tracking.

These systems are composed, in a simplified way, by sensors/transmitters and collectors/receivers, so that the sensors emit a signal that is received and processed by the collectors that, according to the received signal, are capable of processing this signal to determine your location.

These signals emitted by the sensors and received by the collectors can be electrical, magnetic, infrared and others, being adopted and selected according to the specific application of the tracking and spatial location system.

The use of these tracking and location systems is relatively simple in environments and situations in which the signal emitted by the sensor does not encounter barriers or obstacles to reach the collector, however, when there are barriers between these elements, it is necessary to use this barrier as a conductor, thus increasing the complexity of the system.

This problem is especially found in the application of these tracking and spatial location systems in mineral extraction operations, both in open pit mines and in underground mines methods, operations in which the elements of interest to be tracked/located—people, equipment and materials—are buried or below soil.

Therefore, it is of great importance to develop systems and means of signal transmission that overlay this barrier created by the soil to ensure an accurate location of equipment, materials and people in the extraction of ore in open pit mines and underground mines.

SUMMARY

Some present aspects provide a tracking and spatial location system of magnetic sensors and a tracking and spatial location method of magnetic sensors. The present tracking and spatial location system aims to locate and track, with high precision and range, buried magnetic sensors and/or below soil; to determine the optimal frequency of data transmission, between the elements of the system, through a communication protocol; and to increase selectivity and safety in operations for the extraction and transportation of mineral material; besides allowing the implementation of a tracking and spatial location method of magnetic sensors.

BRIEF DESCRIPTION OF THE DRAWINGS

The present aspects are illustrated in detail based on the respective figures.

DETAILED DESCRIPTION

The present aspects provide a tracking and spatial location system of magnetic sensors that comprises two physical elements, which: a plurality of sensors transmitting magnetic field; and at least one reader collector and magnetic field processor.

Magnetic sensors communicate with the collector through a communication protocol including transmission frames used both in the sensors and in the collector, transmitting these frames in the direction of the collector to the sensor, followed by the reverse transmission from the sensor to the collector for each sensor including the tracking and spatial location system of magnetic sensors.

The present aspects also provide a tracking and locating method, which makes use of the tracking and spatial locating system of magnetic sensors, which comprises the following steps: i. inserting a set of pilot sensors in known locations in the region to be explored; ii. transmitting a signal of known power by each of the pilot sensors in a sequential manner; iii. measuring and storing the power emitted by each of the pilot sensors through the sensors; iv. measuring and storing the power emitted by each pilot sensor through the collector; v. sending the powers of each sensor to the collector; vi. changing the position of the collector to a position also known and repeat steps ii to v; vii. changing the collector's location again to a new known position and repeat steps ii to vi; viii. estimating the position of each sensor in relation to each of the pilot sensors based on the measurements; ix. determining the probability of the density of the positioning region of each of the sensors being of high or low content of ore concentration.

Some aspects overcome the barrier created by the soil by wireless transmission through the soil, commonly referred to as through-the-earth transmission, TTE (Through-The-Earth).

A characteristic of through-the-earth transmission is the great attenuation of signals at frequencies below 30 Hz or above 30 kHz for depths of the order of hundreds of meters, limiting both the range of communication between transmitter and receiver, as well as the transmission rate of data between these elements.

In some aspects that make use of the TTE, the sensor/transmitter located on the soil can have a large antenna or power amplifiers, in order to maximize the amount of energy to be transmitted by the magnetic field generated by this sensor.

However, as the sensor/transmitter located in the subsoil typically operates in restricted space conditions and limited energy consumption, there is a great difficulty in transmitting signal from the subsoil to the surface.

This difficulty stems from the fact that the soil characteristics, such as conductivity and permeability, directly influence the transmission of data between the sensor and the collector. Therefore, the tracking and location systems that do not consider variations typical of these parameters may create inaccurate attenuations of the sensors locations.

In addition, some tracking and location systems, when applied in ore extraction operations, whether in open pit mines or in an underground mine, do not have a configuration or protocol to achieve an optimal transmission frequency, causing the location of some sensors to be not precisely obtained.

However, some tracking and location systems are not able to perform a classification of the material in which the sensors are buried, but are only able to determine, imprecisely, the sensor location when it is buried or below soil.

Some systems implement tracking and location systems in ore extraction operations, for example, a control system for carrying out the collection of materials generated by detonation in open pit mines.

Such a system allows the user of an excavator to identify areas with useful ore and areas with barren material, thus avoiding a mixture between these two materials. Said system may include sensors, an antenna and an excavator.

The sensors may be encapsulated in resistant structures, arranged in holes for the insertion of explosives carried out in open pit mines benches. Such sensors are configured to withstand the impacts of the detonation of the bench, and emit a signal to allow the identification of the material in the area where it is located.

This antenna is installed at the end of the excavator arm, which is configured to capture the signal emitted by the sensors. This signal is then processed by the excavator, generating an alert for the equipment operator, warning him that the useful ore zone is nearby.

In this way, when alerted by the captured signal, the operator is able to collect this material and place it in a truck different from the barren material truck.

However, such systems may only allow the use of excavators to perform the tracking of sensors, and may not allow the use of other means with greater speed to perform the location of these sensors, even limiting the area in which the sensors can be applied and located.

In addition, such systems may not provide any type of communication protocol or means to achieve an optimal frequency of transmission between the sensors and the collector, substantially increasing the inaccuracy in the location of these sensors and allowing significant errors in the collection of the material.

Some other systems may allow for marking and monitoring mining operations in open pit mines. Such systems allow the insertion of markers in the soil before detonation, enabling the tracking of these markers after detonation to locate the material of interest in the mine.

The systems may include several markers, a base, a computer and an operator. The markers may include portable devices deposited on the soil before the mine detonates, and these are configured to emit signals. Such markers can also contain several types of sensors such as GPS, temperature, among others.

The base consists of a fixed antenna, configured to capture the signals emitted by the markers. Such base is connected to a computer, which is used to process the signals captured by the base.

With the processing of these captured signals, the system is capable of tracking the markers, displaying a three-dimensional map with the location of these markers. Such a location allows to distinguish the zones with material of interest in the mine being processed.

However, such systems may not allow the use of mobile collectors/antennas, which are fixed on immobile bases, limiting the area of tracking and location of the system and significantly restricting its application in open pit mines.

In addition, such systems may not include any type of communication means or protocol to determine and achieve the optimal signal transmission frequency between the collector and the sensor, substantially increasing the imprecision of the location of the sensors and being able to generate losses and damages.

Some other systems and methods may allow for determining the location of objects in drilling, mining, oil and other operations. This methods may include the emission and capture of low frequency magnetic fields, carried out by transmitters and receivers.

Such transmitters and receivers can be equipment with one, two or three axes of emission, varying according to their application. In one of the configurations, recommended for mining, at least two three-axis transmitters and one axis receiver are applied.

Both transmitters and receivers can be equipped with tilt meters to define their orientation when locating equipment. The receivers are configured to capture the magnetic field emitted by the transmitters, and thus process that field to determine its location.

To determine the location of the transmitter, the method makes use of an algorithm that takes into account location coordinates of reference points (another transmitter with a known location, for example), the frequency of the received field and the orientation (angulation) of the transmitter or receiver (depends on the situation).

However, these systems may not provide any reference to the dimensions of these sensors, nor the resistance of their encapsulation, thus preventing their application in open pit mines detonation holes before the explosion.

In addition, these systems may not provide any means or communication protocol for determining the optimal frequency of system operation, generating significant inaccuracy in the location of these sensors and incurring significant losses and damages.

Further, these systems may not take into consideration the association of collectors/antennas in vehicles or mobile equipment, thus limiting the range of these collectors and the area of application of the system.

However, some present aspects provide a tracking and location system for magnetic sensors that allows determining the location of these magnetic sensors with precision and wide range even when the magnetic sensors are buried or below the soil; define an optimal frequency of signal transmission between the elements of the tracking and location system, significantly increasing accuracy and avoiding errors; and determine the content of ore concentration in the tracked or located region, increasing selectivity and safety in ore extraction and transportation operations.

The present aspects provide a tracking and spatial location system of magnetic sensors, which allows spatially locating one or more sensors/transceivers when located under the soil or piles of rubble in operations to extract mineral material.

Referring to FIGS. 1-10, in some non-limiting aspects, the tracking and spatial location system comprises two physical elements, these being sensors 1 (FIG. 3) and collectors 2 (FIG. 1), both forming part of a communication network to transmit data and information among themselves.

Figure 1:
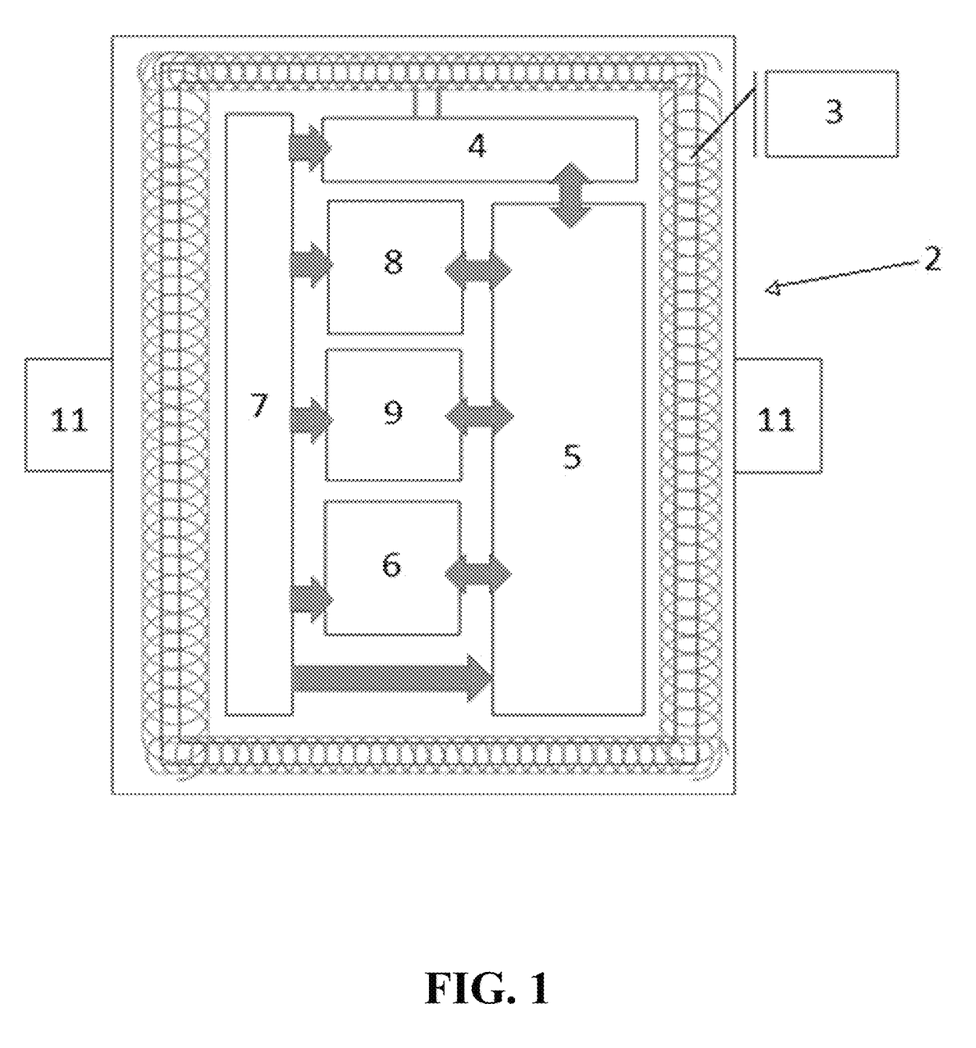
FIG. 1—shows a schematic figure of the tracking and spatial location system collector of the present aspects.

The collector 2 may include a portable electronic device capable of reading the magnetic field emitted by the sensors 1 and processing this information, allowing, through this processing, to determine the spatial location of these sensors 1.

This collector 2, as it is a portable electronic device, is coupled to air or land vehicles 13 (FIG. 10), for example, unmanned aerial vehicles (UAVs) and off-road trucks, respectively.

Figure 10:
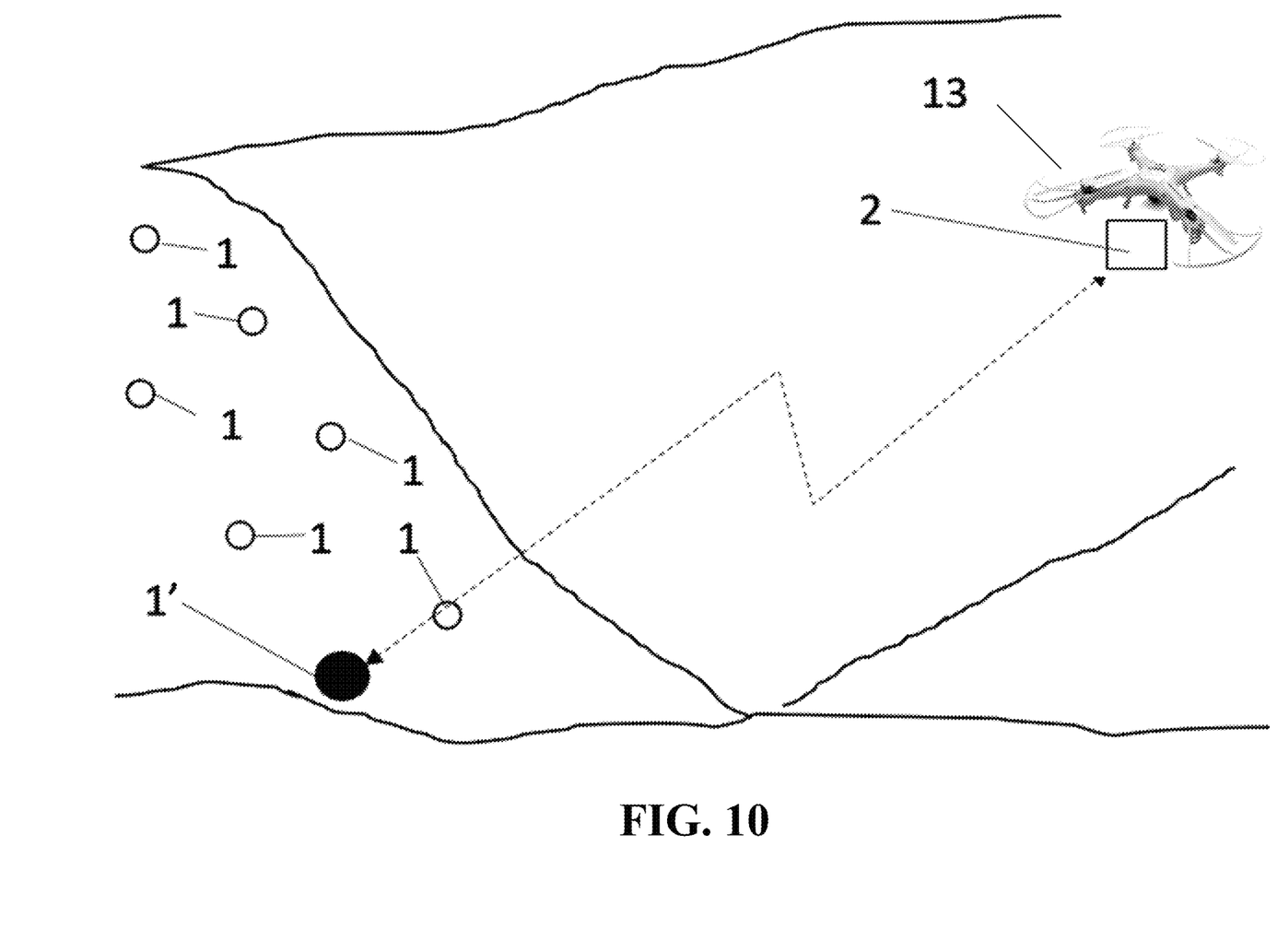
FIG. 10—shows a schematic view of the tracking and spatial location system in an example application of the present aspects.

The coupling of the collector 2 with vehicles 13 allows a variation of its location, making it possible to carry out measurements of the signals emitted by sensors 1 in different locations, statistically increasing the precision in the measurements performed, as well as allowing the use of only one collector 2 in the tracking and spatial location system, drastically reducing the cost compared to systems that use more than one fixed collector.

The positions of the collector 2 at the time of these measurements may be identified by a device external to the collector 2, such as GPS/Glonass positioning systems, and incorporated into the tracking and spatial location system.

Referring to FIG. 1, the collector 2 may include the following subsystems in its structure: antenna subsystem 3; transceiver subsystem 4; data processing subsystem 5; self-location subsystem 6; energization subsystem 7; visualization subsystem and user interface 8; and near field transmission subsystem 9. The spatial arrangement of elements 5 to 9 is merely illustrative, occupying only a small part of the area determined by antenna 3, or can even be located outside it.

Figure 3:
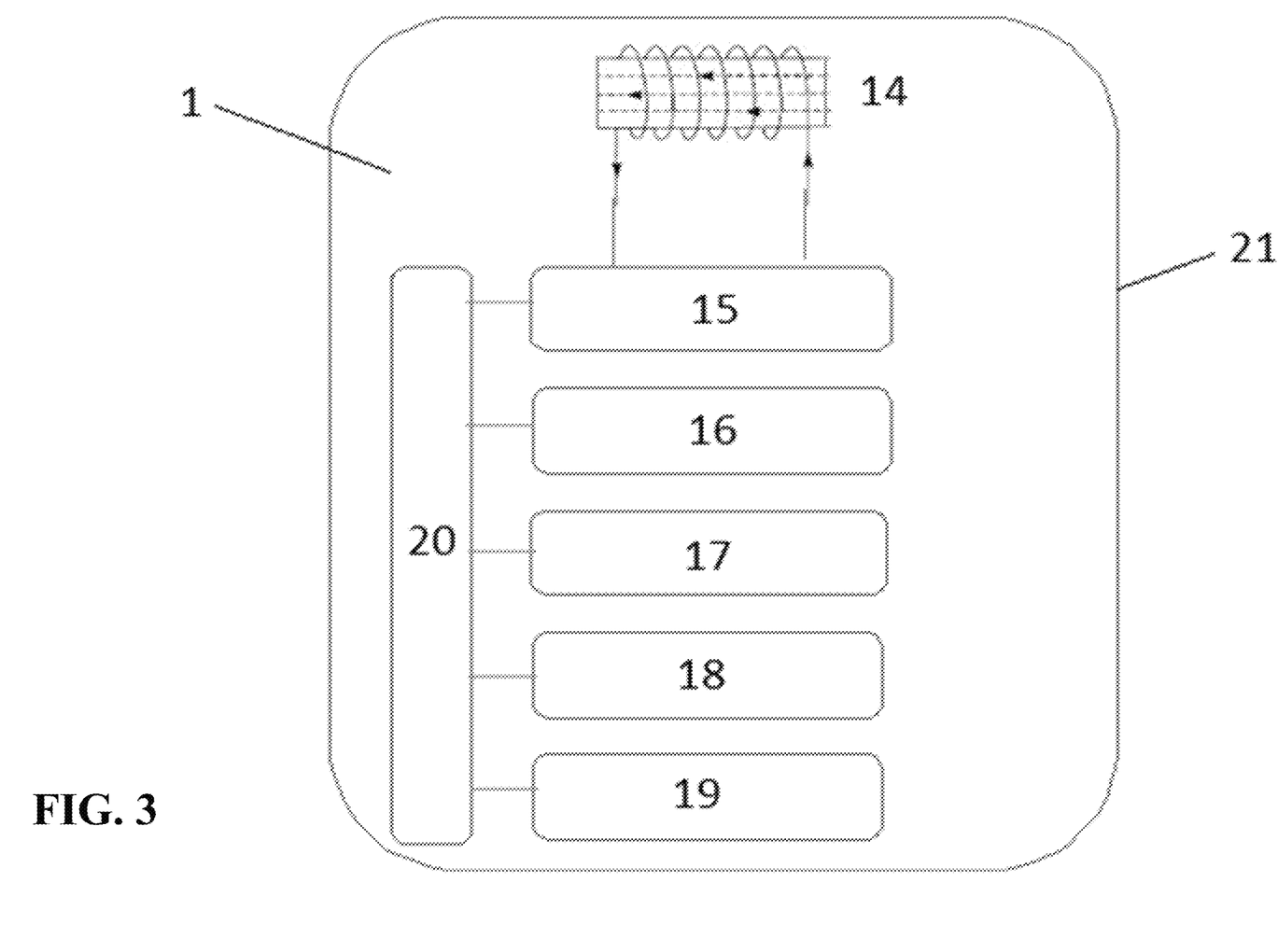
FIG. 3—shows a schematic figure of the tracking and spatial location system sensor of the present aspects.

The antenna subsystem 3 of the collector 2 may include the subsystem responsible for receiving and emitting the magnetic signals to be detected by antennas 14 (FIG. 3) of sensors 1 (FIG. 3). In an aspect, the antenna subsystem 3 has a magnetic loop antenna configuration, with transmission in a plane.

The transceiver subsystem 4 is configured to send and receive the signals from the antenna subsystem 3 and make an interface with the data processing subsystem 5, the latter being responsible for storing the information from one or more sensors 1 (FIG. 3) captured by the antenna subsystem 3.

The data processing subsystem 5, in addition to store the information, is also responsible for processing this information and, through this data and information processing, determining the location of the sensors 1 (FIG. 3).

The auto-location subsystem 6 is configured to provide information to the data processing subsystem 5, providing information relevant to the processing that determines the location of the sensors 1 (FIG. 3).

The energization subsystem 7 is responsible for energizing all the subsystems that make up the collector 2, making a limited distribution of this energy according to the use of each subsystem, thus allowing to guarantee the best use of this energy by the collector 2.

The visualization and user interface subsystem 8 may include the subsystem configured to present information regarding the location of sensors 1 (FIG. 3) clearly to the user, preferably graphically to assist in visualizing the location of sensors 1 (FIG. 1).

The near field transmission subsystem 9 is responsible for transmitting the collected control data, by the antenna subsystem 3, by the transceiver subsystem 4, by the data processing subsystem 5, by the auto location subsystem 6, by the energization subsystem 7 and by visualization subsystem and user interface 8, and transmit this data to determine the angular positioning of the collector 2.

Figure 2:
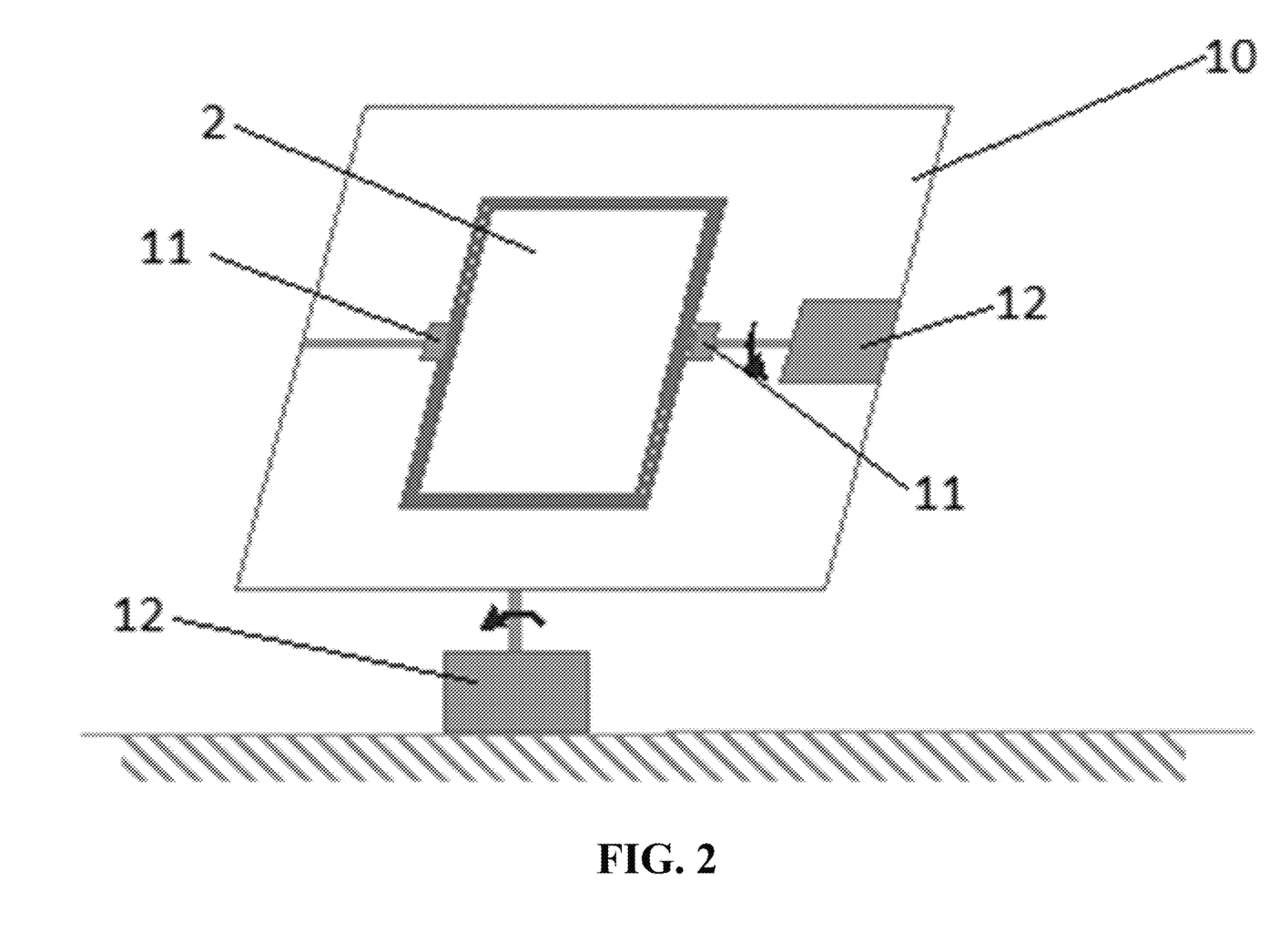
FIG. 2—shows a schematic figure of the assembly of the tracking and spatial location system collector of the present aspects.

This angular positioning of the collector 2 is determined, for example, as provided in FIG. 2, by a mechanical support 10 capable of providing rotation in two perpendicular axes. The collector 2 may be fixed to the mechanical support 10 by connection points 11 arranged on two parallel sides of the housing of the collector 2.

In order to move the collector 2 on the mechanical support 10, motors 12 are arranged at each connection point 11 of the collector 2 and on the base of the mechanical support 10, to rotate the collector 2 and thus change its angular position.

The motors 12 have their drive controlled by the collector 2 itself, through the near field transmission subsystem 9, allowing the angle of this collector 2 to be varied to allow a spatial scan of the signals coming from the sensors 1 (FIG. 3).

This movement of the collector 2 is configured to position it in the direction or angle of maximum energy emission of the sensors 1 (FIG. 3), since, once the collector 2 which may include an antenna 3 of only one plane, it is necessary to vary this angle to achieve the maximum data transmission/reception angle.

In addition, when the collector 2 is attached to vehicles 13 (FIG. 10, aerial or land) the movement of the collector 2 helps to compensate for the movement of the vehicle 13 (FIG. 10) to maintain this maximum transmission/reception angle.

In this way, the collector 2 is moved along the region to be explored by the vehicle 13 (FIG. 10) in which it is fixed, varying its angular position by the mechanical support 10 (FIG. 2) to achieve the maximum transmission/reception of data and, through this data exchange, perform the tracking and spatial location of the sensors 1 (FIG. 3).

Referring to FIG. 3, the sensors 1 may include transmitting equipment that make use of the emission of magnetic field and are capable of enduring high mechanical pressure, resulting from explosions or collapses, having, for example, in one non-limiting aspect, dimensions of the order of 10 centimeters.

These sensors 1, for example, in an aspect, may have the following components: antenna 14; amplification subsystem 15; conversion subsystem 16; modulation and demodulation subsystem 17; information processing subsystem 18; information storage subsystem 19; energy management subsystem 20; and mechanical encapsulation 21.

The antenna 14 of sensor 1 may be made of copper wires wrapped in a ferrite core, material with high magnetic permeability, or wrapped in plastic core, with low magnetic permeability. Antenna 14 is provided with a core 22 of one of these two materials and one or more pairs of copper wires that surround this core to form antenna 14.

Figure 4:
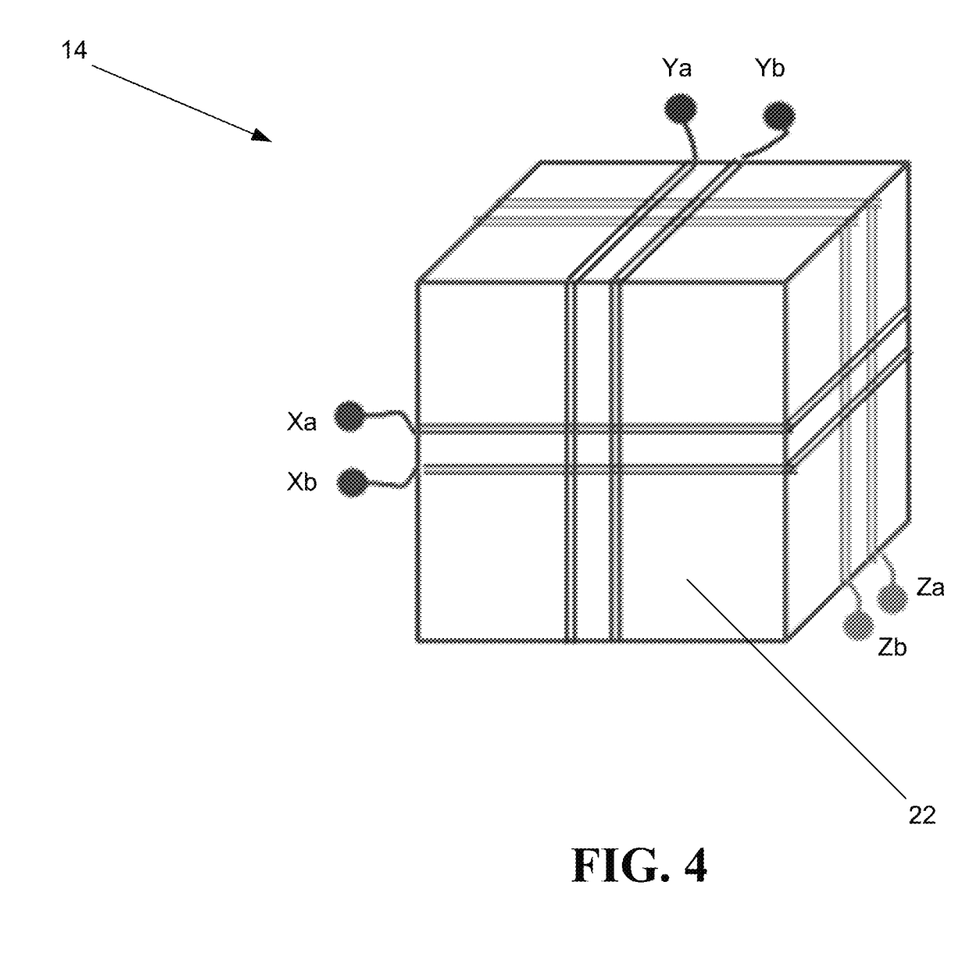
FIG. 4—shows a first example constructive configuration of the tracking and spatial location system sensor antenna of the present aspects.

FIGS. 3 and 4 provide two non-limiting example geometry of the antenna 14 determined according to two configurations.

Referring to FIG. 3, the first example constructive configuration of the antenna 14 represents a cubic geometric for the core 22, composed of material with low magnetic permeability, surrounded by three pairs of windings in orthogonal arrangement, each of which can be driven independently by the respective terminals (Xa, Xb, Ya, Yb, Za, Zb).

These terminals (Xa, Xb, Ya, Yb, Za, Zb) are connected to the amplification subsystem 15 (FIG. 3) of sensors 1 (FIG. 3), being responsible for amplifying the signal to be transmitted or captured by the selected antenna 14.

Figure 5:
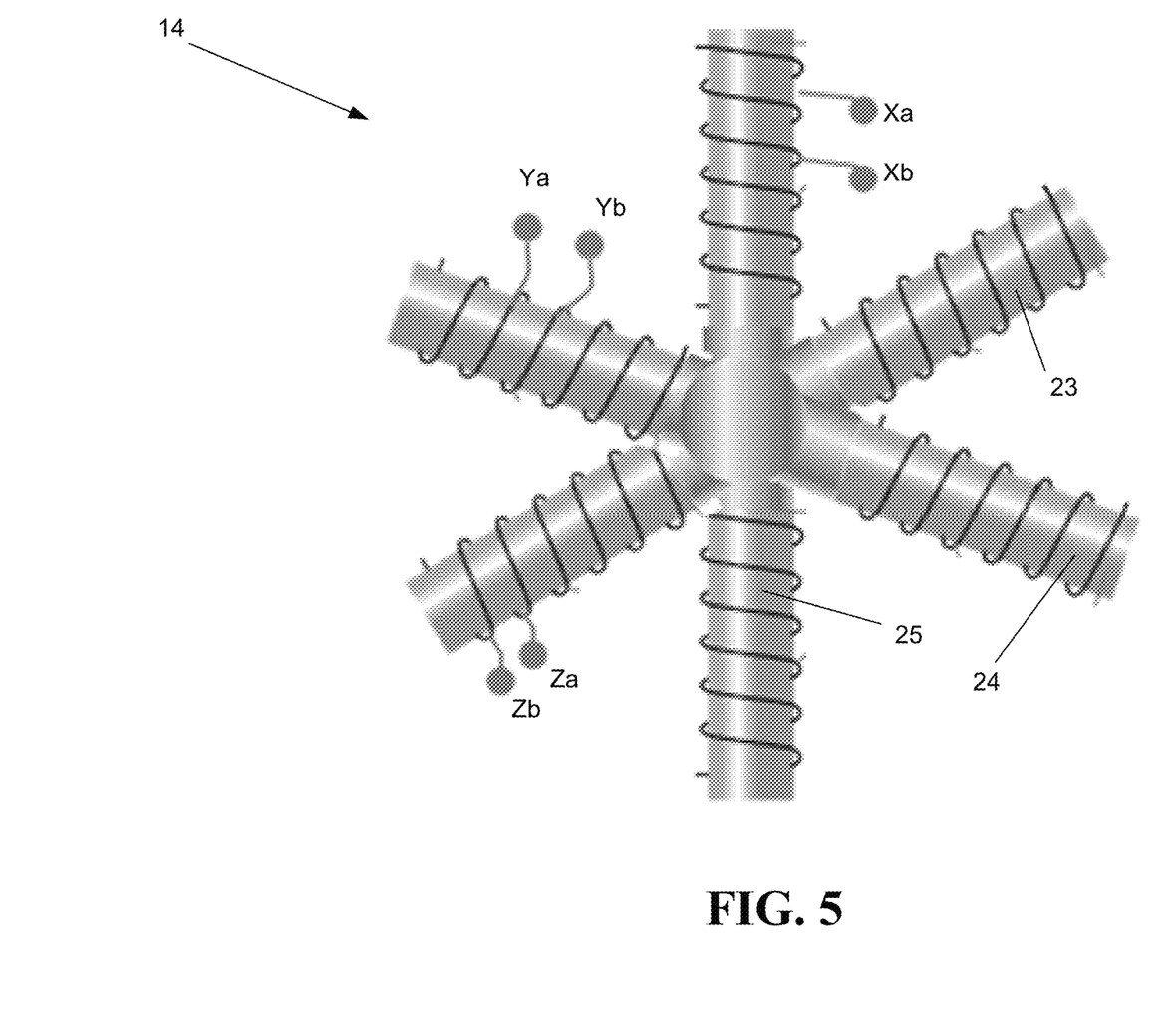
FIG. 5—shows a second example constructive configuration of the tracking and spatial location system magnetic sensor antenna of the present aspects.

Referring to FIG. 5, the second example constructive configuration of antenna 14 may include antenna 14 configured with a geometry derived from the overlap of three cylinders 23, 24, 25 composed of ferrite, material with high magnetic permeability arranged in perpendicular axes, each of them surrounded by a pair of copper wires.

In both of the aforementioned example geometric configurations, the activation mode of the terminals (Xa, Xb, Ya, Yb, Za, Zb) is carried out independently, configuring the existence of three independent antennas sharing the same core 22, 23, 24, 25, or simultaneously, configuring the simultaneous emission (or capture) in the three perpendicular axes of the terminals, that is, the three orthogonal planes.

Referring back to FIG. 3, the determination of the drive mode to be used is responsibility of the communications protocol to be implemented in the information processing subsystem 18 and in the information storage subsystem 19 of sensor 1, being, in one non-limiting example aspect, the three orthogonal axes activated of the antenna 14.

The amplification subsystem 15, as explained above, is responsible for amplifying signals coming and going to the antenna 14, which are transmitted and received from the collectors 2 (FIG. 1).

The conversion subsystem 16 is configured to perform an analog to digital and digital to analog conversion of the signals received by the antenna 14. The modulation and demodulation subsystem 17 is responsible for retrieving or inserting information from the information processing subsystem 18, information that is stored in the information storage subsystem 19.

The components of the sensors 1 are energized by the energy management subsystem 20 and are encapsulated inside the mechanical encapsulation 21, which is resistant to mechanical compression to endure pressures resulting from explosions and landslides.

In the information storage subsystem 19 there are specific parameters for the transmission of signals by sensors 1, in particular the optimal frequency of operation to be used by the modulation and demodulation subsystem 17. In addition, the information storage subsystem 19 also acts to control the energy management subsystem 20.

This control allows the energy management subsystem 20 to supply power to the other subsystems of sensors 1 in two non-exclusive ways, which are: (i) via battery; or (ii) by harvesting energy from the signal from the collector 2 (FIG. 1), thus ensuring a greater amount and durability of the energy from the sensors 1.

In both ways of power supply, the energy management subsystem 20 exchanges information with the information processing subsystem 18, in order to allow the activation and shutdown of the components of the aspects only when necessary, maximizing the use of the battery or the energy from the signal captured by the antenna 14.

Figure 6:
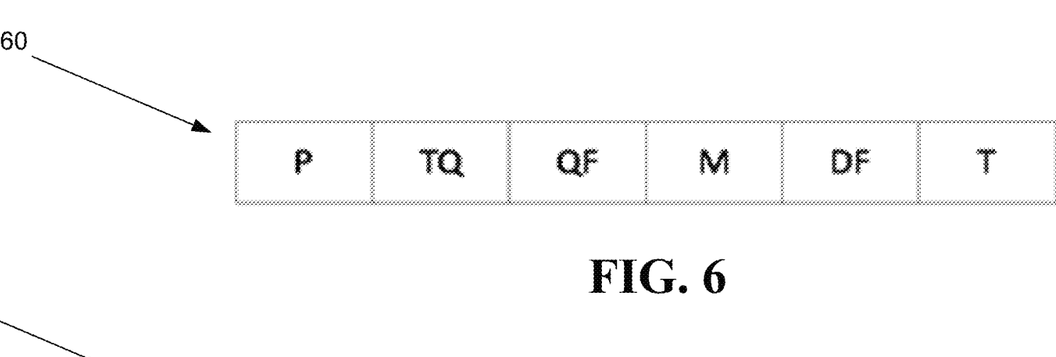
FIG. 6—shows an example data frame originating from the tracking and spatial location system collector of the present aspects.
Figures 7, 8:
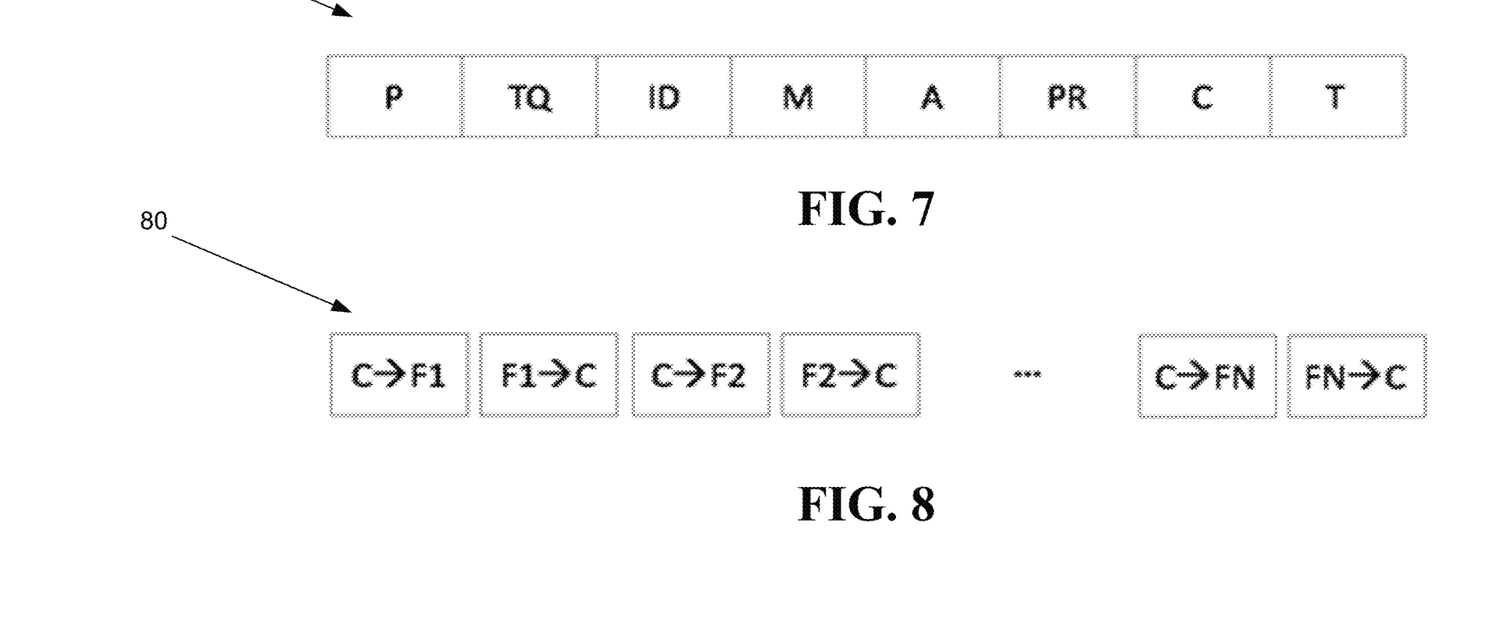
FIG. 7—shows an example data frame originating from the tracking and spatial location system sensor of the present aspects.
FIG. 8—shows an example table with the procedures for transmitting signals from the elements of the tracking system and spatial location of the present aspects.

Referring to FIGS. 6-8, sensors 1 (FIG. 3) and collector 2 (FIG. 1) may communicate with each other, using a communications protocol, which is responsible for optimizing this communication and achieving an optimal frequency of data transmission between these elements, that is, between sensors 1 (FIG. 3) and the collector 2 (FIG. 1).

The communication protocol between sensors 1 (FIG. 3) and collectors 2 (FIG. 1) may include transmission frames 60, 70 to be used in sensors 1 (FIG. 3) and collectors 2 (FIG. 1), respectively, these transmission frames are described below.

The transmission frames 60, 70 may be size fixed, and with asymmetric information depending on the origin of the transmission. Referring to FIG. 6, for data originating from collector 2, the frame 60 has the following fields: preamble (P) to identify the beginning of the transmission, for the purpose of acquiring frame synchronism; frame type (TQ) to identify transmission modes; number of sensors (QF) for dimensioning the frame size; transmission mode (M) to identify the modulation type; frequency (DF) to send power increase; and end (T) for identification of end of frame.

Referring to FIG. 7, for the data originating in sensor 1, the protocol provides the following fields in the frame 70: preamble (P) for identification of the beginning of the transmission, for the purpose of acquiring frame synchronism; frame type (TQ) to identify transmission modes; sensor identifier (ID) to identify in collector 2 which sensor 1 sends the information; transmission mode (M) to identify the modulation type; transmitting antenna (A) to identify which of the antenna's axis terminals was activated (Xa, Xb, Ya, Yb, Za, Zb); received power (PR) to provide power information for the location algorithm; channel coding bits (CC) to provide robustness to communication in the presence of noise and interference; and end (T) for identification of end of frame.

The transmission in the physical layer may be carried out in digital binary modulation by phase keying (BPSK—Binary Phase Shift Keying), amplitude keying (OOK—ON/OFF Shift Keying), or frequency keying (BFSK—Binary Frequency Shift Keying), and the carrier frequency may be dynamically adjusted by the aspects themselves, in order to achieve the optimal operating frequency and keep it at an optimal value throughout the process of tracking and spatial location of the sensors 1 (FIG. 3).

Referring to FIG. 8, access to the medium is multiplexed over time, with transmission from collector 2 to sensor 1, followed by reverse transmission, that is, from sensor 1 to collector 2, according to table 80. All identified sensors 1 transmit in the order of detection identified by the collector 2, until the most recently identified sensor 1 transmits its frame.

Then, the first identified sensor transmits again, repeating the operations defined in the transmission frames in FIG. 8, that is, the transmissions from collector (C) to the first sensor (F1) and later from the first sensor (F1) to the collector (C), repeating them for each sensor of the tracking and spatial location system.

Each of the sensors 1 detected by the collector 2 with distinct identification from the identifications registered in the data processing subsystem 5 of the collector 2 generates the creation of a pair of frames, up to the maximum number of distinct sensors 1 inserted in the tracking and location space system.

This communication protocol determines and regulates the optimal frequency of data transmission between sensors 1 and the collector 2, allowing the switching of the frames, described above, to be performed on all sensors 1 that make up the tracking and spatial location system of the present aspects.

To determine the optimal frequency, the protocol uses an initial frequency (F0) of operation, which may be defined, a priori, based on prior knowledge of the size of the rubble pile or the depth of the soil in which sensors 1 are inserted, as well as the geological composition of this pile or soil.

This initial frequency (F0) may be used for determining the optimal frequency for each of the sensors 1, so that the optimal frequency is defined according to the following steps performed by the communication protocol described below.

The determination of the optimal frequency starts with an initial frequency (F0), which is known by sensor 1 and collector 2. Collector 2 then sends a message to sensor 1 with that initial frequency (F0).

Sensor 1 receives this signal from collector 2 and transmits an acknowledgment response (ACK—acknowledge) to collector 2 within the next time frame. The collector 2 then measures that power (P0) generated by the initial frequency (F0) and transmitted by sensor 1, storing it.

Collector 2 then sends a new message to sensor 1 with a frequency higher (FS) than the initial frequency (F0), this being the initial frequency (F0) plus the desired frequency interval (IF), so that, the frequency higher (FS) is defined as F0+IF.

Sensor 1 then receives this new signal and transmits an acknowledgment response (ACK—acknowledge) to collector 2 in the next time frame. Collector 2 measures the new upper power (P+) for the higher frequency (FS) transmitted and stores it.

If the upper power (P+) is higher than the initial power (P0), the sensor 1 is informed, using the upper frequency (FS) as the optimal frequency and terminating the protocol for this sensor 1, starting a new interaction between another sensor 1 and collector 2.

If the upper power (P+) is lower than the initial power (P0), the collector 2 sends a new message to sensor 1 with a lower frequency (Fl), that is, the initial frequency (F0) subtracted from the frequency interval (IF), resulting in the lower frequency (lF) which is defined as F0−IF.

Sensor 1 then receives the new signal and transmits an acknowledgment response (ACK) to collector 2 in the next time frame. Collector 2 then measures the new lower power (P−) received for that lower frequency (Fl) and stores it.

If the new lower power (P−) is greater than the initial power (P0), sensor 1 is informed, using the lower frequency (Fl) as the optimal frequency and terminating the protocol for this sensor 1, starting then, a new interaction with another sensor 1.

If the new lower power (P−) is less than the initial power (P0), the initial frequency (F0) is used as the optimal frequency and the interactions with this sensor 1 are closed, starting the protocol for the other sensors 1.

In this way, the optimal frequency for each of the sensors 1 in the tracking and spatial location system of the present aspects is defined by significantly increasing the accuracy in the location of the sensors 1, as well as the location of all the sensors 1.

In an alternative aspect for determining the optimal frequency, this is an optimal frequency for the tracking and spatial location system as a whole, unlike the aspect described above, which defines the optimal frequency for each of the sensors 1 of the tracking and spatial location system.

In this alternative aspect, this optimal frequency is determined according to a criterion for maximizing a cost function, which represents the performance of the tracking and spatial location system, so that, as the frequency is the same for all sensors 1, determined sensors 1 operate at a frequency below the optimum, however, without damage to the tracking and spatial location system as a whole.

The frequency defined as optimal by the tracking and spatial location system, in this alternative aspect, is within the range of minimum frequencies and maximum frequencies, quantized in a determined number of discrete frequencies, spaced apart from one frequency interval (IF).

This optimal frequency of the alternative aspect is achieved by optimization algorithms or methods such as, for example, iterative, heuristic algorithms and even brute force. An example is the incremental scan of the frequency until reaching a stop criterion, so that a fixed percentage of responding sensors occurs.

Based on the incremental search and assuming temporal multiplexing of the transmission of sensors 1, the collector 2 starts the process by sending a broadcast signal with the same frequency to all sensors 1. Each sensor 1 is able to detect this signal and send a response (ACK) at the same frequency, after a time interval, determined by the identification protocol of each sensor 1.

If this fixed percentage in the power is not exceeded, within a pre-defined time interval, the collector 2 stores the percentage of responses received and transmits a second frequency signal higher than the frequency of the initial signal.

This process of signal emission and response reading is repeated until the percentage of the power of responding sensors is exceeded or the maximum frequency is reached, so that, in the latter case, the frequency corresponding to obtaining the highest percentage of the power of responding sensors is used.

Therefore, the definition of an optimal frequency of data transmission between sensors 1 and collector 2 is provided in the present aspects through the communication protocol between sensors 1 and collector 2, and the optimal frequency is defined and used throughout the process of tracking and spatial localization in extraction and transport of mineral material.

The present aspects may have application in mineral extraction operations, both in open pit mines and underground mines, for example, mineral extraction in open pit mines to assist in the distinction of ore and barren (material without added economic value).

In the extraction of minerals in open pit mines, during the preparation of blasting holes carried out in the open pit mines' benches, information collected by the equipment used in this drilling, typically drill rigs, is stored in sensors 1 of the tracking and spatial location system.

The sensors 1, after the insertion of the information collected during the drilling, are then inserted inside these drilled holes or in additional holes, forming a new mesh dedicated to the sensors 1. In order to avoid a large storage of information on sensors 1, only basic information is stored on sensors 1, also avoiding an increase in the cost of sensors 1.

For the extraction of mineral in open pit mines, a binary classification (ore/barren) represents an aspect, which can be extended to other more complete and complex classifications, aiming even to differentiate the ore content in each hole sensor 1 is inserted.

These holes are then filled with explosive material, typically ANFO or emulsion, and later detonated to dismantle the bench. After detonation and consequent disassembly, the retrieval of information contained in sensors 1 and the location of these allow the operator to know exactly the type of material being extracted, consequently increasing the selectivity of the mine.

The located sensors 1 may be represented and defined as points P0 in the coordinates (x0, y0, z0), in a three-dimensional Cartesian reference, used by the collector 2. The collector 2 then takes a certain number of measurements of the received power in different positions based on the communication protocol, making it possible to estimate the position of sensors 1 by trilateration algorithms.

These measurements may be carried out both by using different collectors 2 in known positions, and/or by using a single collector 2 in different known positions, since sensors 1 are static during measurements.

The distance estimate, between the points where the sensors 1 and the collector 2 are located, is performed based on the knowledge of the attenuation of the signal between the collector 2 and the sensor 1, collected through a specific field in the transmission frame of the communication protocol between these elements, this being the PR field.

The trilateration algorithms based on the approximate knowledge of the distance between each sensor 1 and the collector measurements seek to find the point that has the smallest average square error between the distances estimated by the location and the distances initially measured.

Figure 9:
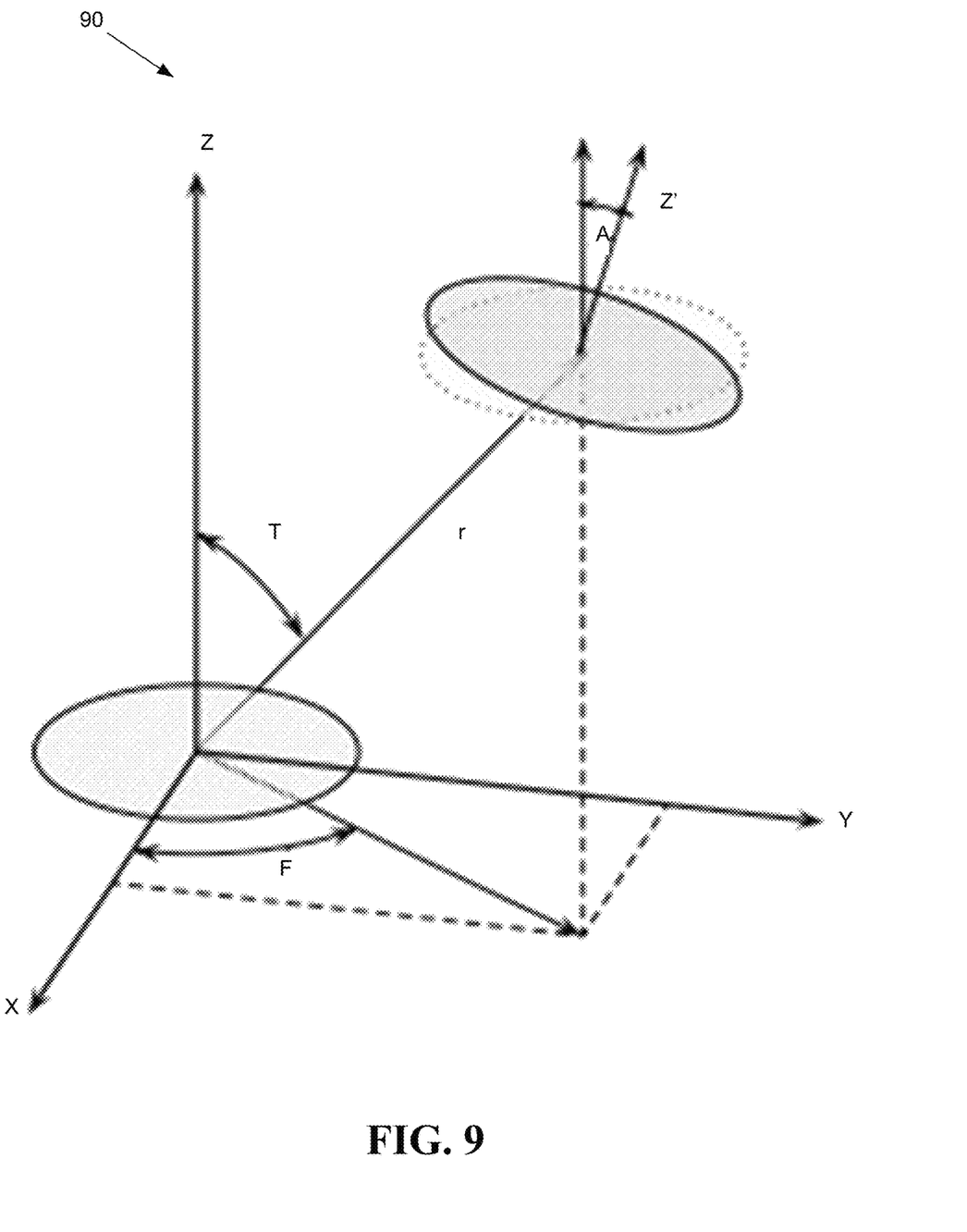
FIG. 9—shows an example schematic view of the transmission axes of the elements of the tracking and location system of the present aspects.

However, referring to the example schematic view 90 in FIG. 9, for example, the level of signal strength between the collector 2 and the sensors 1 may depend largely on the angle T between the antennas of sensor 1 and the angle A of the antenna 14 on the collector 2, making the estimation of the distance between the collector 2 and the sensors 1, from the level of signal strength between the collector 2 and the sensors 1, quite complicated, since it depends on the distance between the sensor 1 and the collector 2, the angle T and the angle A.

The solution used in one non-limiting aspect is to use three-dimensional antennas on sensors 1, since the combination of the three dimensions of the three-dimensional antenna generates a gain independent of the positioning angle of the three-dimensional antennas.

Still in this aspect, antennas 14 of only one plane are used in the collector 2. The angle of the antenna 14 is changed by rotating motors 12, installed in the mechanical support 10 in which they are applied, in order to find the angle of greatest gain and repeat this variation for each sensor 1 of the tracking and spatial location system.

In addition to the variation in the angle of the antenna 14 of the collector 2, another solution also applied in the present aspects to solve the dependence of three variables in the estimation of the distance between sensor 1 and the collector 2 includes the use of a location algorithm that, instead of calculate the mean square error of the distances between the collector 2 and the sensor 1, calculates the mean square between the measured signal level and the expected signal level.

This expected signal can be estimated from a propagation model and by the radiation diagram of the collector 2 and sensor 1 antennas. Referring to FIG. 10, since the propagation model depends on material characteristics such as, for example, granularity and conductivity, for the determination of this propagation model it is necessary to use pilot sensors 1'.

These pilot sensors 1' are inserted in known positions in the pile of rubble to be explored, so that it is possible to calibrate the propagation model in an initial communication phase, measuring the signal level received by this pilot sensor 1' in various positions.

This measurement of the signal level is performed by the collector 2, which is also arranged in a known position to carry out this measurement, so that, by adjusting the signal level curves received, it is possible to find the appropriate propagation model for that application.

In the application of the tracking and spatial location system in the mineral extraction in open pit mines, of the present aspects, both the position of each sensor 1 as well as the composition of ore (material with added value or sterile) most likely in this location of sensor 1 may be needed.

Based on the information included in the tracking or spatial location system, that is, there are two types of material in the pile of rubble to be explored—high and low concentration of ore—and the number of sensors 1 that were inserted in blast holes in the region of high or low concentration, these data are processed to estimate the probability of these sensors 1 being in a position of high or low ore concentration.

This processing provides only an estimate of the position of sensor 1 and, with knowledge of the mean quadratic error of the estimate of the position of sensor 1, it is estimated the probability that the position of this sensor 1 is located in an area of high or low content of mineral concentration.

The processing then makes a relationship between the probability that at the point where sensor 1 is located, it has a material of high or low content of mineral concentration.

This processing makes use of the tracking and spatial location method of buried magnetic sensors 1, the steps of this tracking and spatial location method are described in detail below.

The first stage of the spatial tracking and location method includes inserting a set of pilot magnetic sensors 1' at known locations in the pile of rubble to be explored. In this first stage, the collector 2, installed in an aerial or land vehicle 13, remains in an initial position also known for the tracking and spatial location system.

The second stage of the spatial tracking and location method includes the sequential transmission of a signal of known power by each of the pilot sensors 1', in a predetermined time sequence. The frequency used in this signal follows the communications protocol adopted by the tracking and spatial location system.

The third stage of the spatial tracking and location method includes measuring and storing the power emitted by each of the pilot sensors 1', this measurement and storage being performed by the sensors 1 disposed in the pile of rubble.

The fourth stage of the spatial tracking and location method also includes measuring and storing the power emitted by each of the pilot sensors 1', however, with the measurement and storage performed by the collector 2 this time, and not by the sensors 1.

The fifth stage of the spatial tracking and location method starts after multiple measurements from the third and fourth stages, including sending the powers of each of the sensors 1 to the collector 2, resulting in a mass of data from the number of sensors 1 and collectors 2, present in the spatial tracking and location system.

The sixth step of the tracking and spatial location method includes changing the position of the collector 2, changing it to a position also known. Still in the sixth stage, now with the collector 2 in a new position, the second and fifth stages are repeated to increase the accuracy of the measurements.

The seventh stage of the tracking and spatial location method starts after the repetition of the second and fifth stages with the collector 2 in a different position. The seventh step, then, includes a new change in the location of the collector 2 to a new position also known, repeating the second and sixth steps to ensure statistical reliability of the measurements.

The eighth and final stage of the method of location and spatial tracking includes estimating the position of each sensor 1 in relation to each of the pilot sensors 1' and determining the probability of that region containing high or low ore concentration.

It is considered that there are two types of material, high and low ore concentration, and it is known a priori that K sensors 1 are placed in a region of high concentration and L sensors 1 in a region of low concentration. The location algorithm provides an estimate of the position of each sensor, and, with knowledge of the mean square error of this estimate, the density probability function of the position of the kth sensor 1 placed in a high-content area is obtained. In an equivalent way, the probability density function of the positions of the sensors initially placed in a low-content region is obtained.

The determination of the probability that a given region is of high or low concentration of ore is achieved by applying a hypothesis test, which calculates the likelihood ratio obtained by dividing (i) the algebraic sums of the K probability density functions corresponding to the positions of sensors 1 with high content (numerator), and (ii) the algebraic sums of the L probability density functions of the positions of sensors 1 with low content (denominator).

In this way, by using the tracking and spatial location system and the tracking and spatial location method of the present aspects, dilutions (aggregation of barren to the ore) and losses (disposal of ore with the barren) are reduced, as it is known if the material in which a given sensor 1 is inserted is ore or barren.

In alternative aspects, the tracking and spatial location system of the present aspects may be used to track people and equipment applied in underground mines.

In this alternative aspect, the tracking and spatial location system increases safety during operation, ensuring that the people or equipment found in the underground mine have their locations precisely known, to facilitate rescue and removal operations of people and equipment in case of emergencies in this location, for example, the collapse of underground mine galleries.

Therefore, having described the tracking and the spatial location system of buried magnetic sensors 1 and the tracking and spatial location method, it remains clear that the present aspects achieve the proposed objectives, performing a tracking with high precision and range.

In addition, the tracking and spatial location system of buried magnetic sensors 1 reaches an optimal frequency for data transmission between sensors 1 and the collector 2 through a communication protocol, increasing the efficiency of this signal transmission.

The tracking and spatial location system of the present aspects also increases selectivity and safety in operations for extracting and transporting mineral material. Selectivity is increased by determining the ore content in the regions where sensors 1 are located; and security through accurate tracking of people located below ground.

Thus, the present aspects mitigate the problems inherent in this activity, in addition to promoting improvements in efficiency, safety, reach and selectivity in extraction and transport of mineral material processes.

Thus, although only some example aspects have been described herein, it is understood that various omissions, substitutions and changes can be made by a technician versed in the subject, without departing from the spirit and scope of the present invention. The described aspects should be considered in all aspects only as illustrative and not restrictive.

It is expressly provided that all combinations of elements that perform the same function in substantially the same way to achieve the same results are within the scope of the present aspects. Substitutions for elements from one embodiment described to another are also fully intended and contemplated.

It should be noted that the drawings are not necessarily to scale, having a merely conceptual nature. The intention of the aspects proposed by the present disclosure can therefore be limited, as indicated by the scope of the appended claims.

The invention claimed is:

1. A tracking and spatial location system of magnetic sensors, comprising:
   a plurality of sensors transmitting magnetic fields; and
   at least one collector reader and a processor of the magnetic fields emitted by the plurality of sensors;
   wherein the plurality of sensors are configured to communicate with the at least one collector by a communication protocol including transmission frames used both in the plurality of sensors and in the at least one collector, wherein the communication protocol includes transmitting the transmission frames in the direction of the at least one collector to the plurality of sensors followed by a reverse transmission from the plurality of sensors to the at least one collector, for each of the at least one sensors in the tracking and spatial location system.

2. The tracking and spatial location system of claim 1, wherein the at least one collector includes:
   a receiving subsystem for receiving and sending magnetic signals;
   a transceiver subsystem for sending and receiving signals from the receiving system;
   a processing subsystem to store and process information received by the at least one collector;
   a self-locating subsystem to provide a location of the at least one collector to the processing subsystem;
   an energization subsystem for energizing the at least one collector;
   a visualization and user interface subsystem to present the information processed by the at least one collector; and
   a near field transmission subsystem to determine an angular positioning of the at least one collector.

3. The tracking and spatial location system of claim 2, wherein the receiving subsystem of the at least one collector comprises antennas of at least one plane.

4. The tracking and spatial location system of claim 2, wherein the at least one collector is fixed on a mechanical support that provides a rotation in two perpendicular axes by motors automatically controlled by the at least one collector, changing the angular positioning of the at least one collector.

5. The tracking and spatial location system of claim 4, wherein the mechanical support is configured to be fixed on a vehicle to move the at least one collector.

6. The tracking and spatial location system of claim 1, wherein each sensor of the plurality of sensors comprises:
   an antenna made of a material with a high magnetic permeability;
   an amplification subsystem to amplify signals coming and going to the antenna;
   a conversion subsystem for converting the signals received by the antenna from analog to digital or from digital to analog;

a modulation and demodulation subsystem for retrieving or entering information;

an information processing subsystem;

an information storage subsystem;

an energy management subsystem to energize the sensor; and a mechanical encapsulation resistant to mechanical compression to house sensor elements of the sensor.

7. The tracking and spatial location system of claim 6, wherein the antenna of the sensor is three-dimensional.

8. The tracking and spatial location system of claim 1, wherein the communication protocol is configured to define an optimal communication frequency to be applied to the tracking and spatial location system.

9. The tracking and spatial location system of claim 8, wherein the optimal frequency is defined by:
   i. defining an initial frequency (F0) of operation based on prior knowledge of a depth and geological characteristics of a soil in which the plurality of sensors are inserted;
   ii. sending a first signal from the at least one collector to a sensor at the initial frequency (F0);
   iii. receiving the signal emitted by the at least one collector and transmitting a first response from the sensor to the at least one collector;
   iv. measuring and storing a power received by the at least one collector generated by the initial frequency (F0);
   v. sending a new signal to the sensor with a higher frequency (FS) defined as the initial frequency (F0) plus a frequency interval (IF);
   vi. receiving the new signal by the sensor and transmitting a second response from the sensor to the at least one collector in a next time frame;
   vii. measuring and storing an upper power (P+) received by the at least one collector for the higher frequency (FS) transmitted;
   viii. if the upper power (P+) is higher than the initial power (P0), informing the sensor and using the upper frequency (FS) as the optimal frequency for the sensor;
   ix. if the upper power (P+) is lower than the initial power (P0), sending from the at least one collector (2) another new signal to the sensor with a lower frequency (F1) defined as the initial frequency (F0) minus the frequency range (IF);
   x. receiving the another new signal by the sensor and transmitting a third response from the sensor to the at least one collector in a subsequent time frame;
   xi. measuring and storing the lower power (P−) received for lower frequency (F1);
   xii. if the lower power (P−) is greater than the initial power (P0), informing the sensor and using the lower frequency (F1) as the optimal frequency for the sensor; and
   xiii. if the lower power (P−) is less than the initial power (P0), using the initial frequency (F0) as the optimal frequency for the sensor.

10. The tracking and spatial location system of claim 1, wherein the tracking and spatial location system is applied in ore extraction operations in open pit mines, wherein the plurality of sensors are inserted in detonation holes in benches and the plurality of sensors are located after dismantling the benches by the at least one collector.

11. The tracking and spatial location system of claim 10, wherein the plurality of sensors are fed with geological information about a blasting hole in which the plurality of sensors are inserted, classifying the blasting hole as ore or barren.

12. The tracking and spatial location system of claim 11, wherein the tracking and spatial location system determines a probability of a sensor located to be in a region of high or low content ore.

13. The tracking and spatial location system of claim 10, wherein the tracking and spatial location system is applied in ore extraction operations in underground mines, fixing the plurality of sensors on equipment and people and locating the equipment and the people through the at least one collector.

14. A tracking and location method, comprising:
   i. inserting a plurality of pilot sensors in known locations in a region to be explored;
   ii. transmitting a signal of a known power by each of the plurality of pilot sensors in a sequential manner;
   iii. measuring and storing a power emitted by each of the plurality of pilot sensors by a plurality of sensors;
   iv. measuring and storing the power emitted by each of the plurality of pilot sensors through at least one collector;
   v. sending the power of each of the plurality of sensors to the at least one collector;
   vi. changing a first position of the at least one collector to a second position also known and repeating steps ii to v;
   vii. changing the second location of the at least one collector again to a third position also known and repeating steps ii to vi;
   viii. estimating a position of each of the plurality of sensors in relation to each of the plurality of pilot sensors; and
   ix. determining a probability of a density of a positioning region of each of the plurality of sensors to be of high or low content of ore concentration.

15. The tracking and location method according to claim 14, wherein a frequency of signal transmission emitted in step ii is an optimal frequency defined by a communication protocol.

16. The tracking and location method according to claim 14, wherein an estimation of the position of each of the plurality of sensors in step viii is performed by processing a mean quadratic error between a signal level measured by the plurality of sensors and the at least one collector and an expected signal level.

17. The tracking and location method according to claim 16, wherein the expected signal level is defined based on a propagation model that depends on characteristics of a material.

18. The tracking and location method according to claim 14, wherein determination of the probability of the density of the positioning region of each of the plurality of sensors being of high or low content of ore is given by an application of a hypothesis test which calculates a likelihood ratio obtained by dividing (i) algebraic sums of K probability density functions corresponding to positions of the plurality of sensors with high content (numerator), and (ii) the algebraic sums of L probability density functions of the positions of the plurality of sensors with low content (denominator).

* * * * *